INVENTORS
THOMAS P. FARKAS
JAMES S. SIMS, JR.
BY Harris & Luther
ATTORNEY

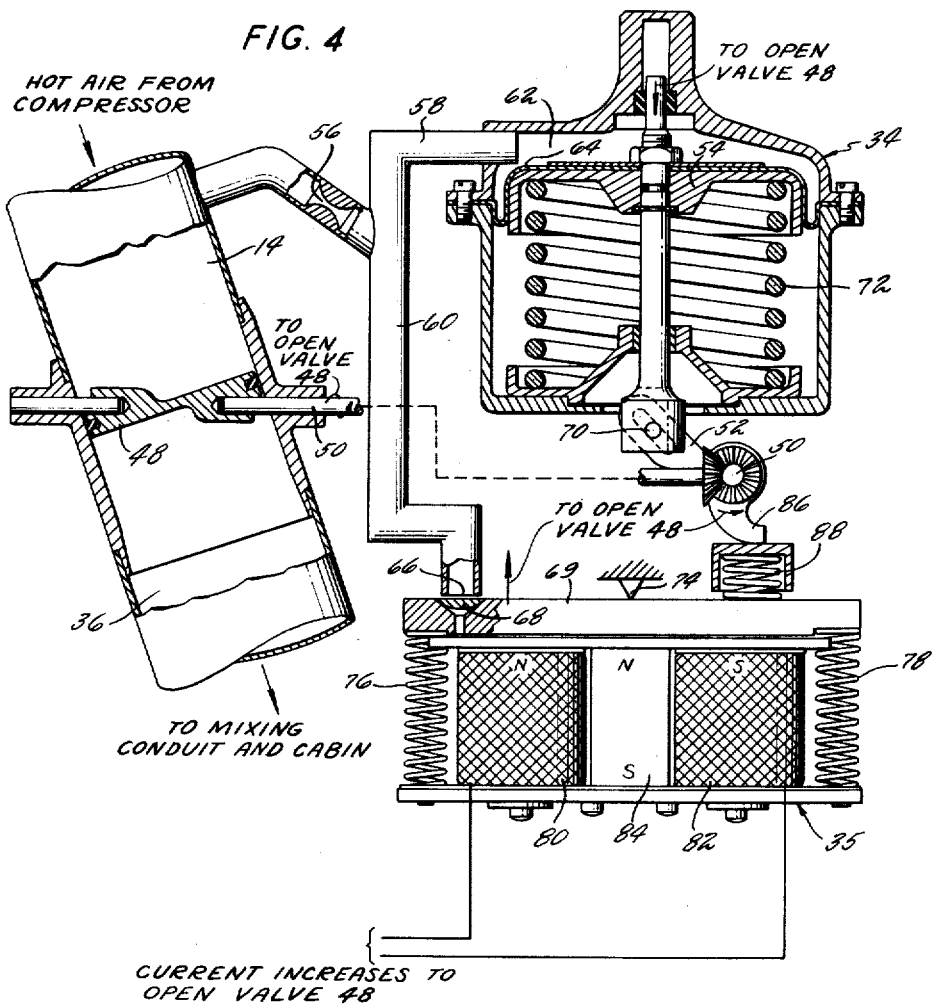

United States Patent Office 2,917,288
Patented Dec. 15, 1959

2,917,288
CABIN TEMPERATURE CONTROL SYSTEM

James S. Sims, Jr., Granby, and Thomas P. Farkas, Bloomfield, Conn., assignors to United Aircraft Corporation, East Hartford, Conn., a corporation of Delaware Application November 26, 1954, Serial No. 471,152

17 Claims. (Cl. 257—276)

This invention relates to a cabin temperature control system and particularly to a system having means automatically limiting airplane cabin temperature, the rate of increase of temperature of air being fed to the cabin, and the temperature of the air fed into the cabin.

An object of this invention is a control which will limit the rate of change of temperature of the air being fed through a duct.

A further object is a temperature control for an enclosure in which the temperature of the enclosure is the primary control and the rate of change of the temperature of fluid being fed to said enclosure is a limiting control.

A further object is a temperature control for an enclosure in which the temperature of the enclosure is the primary control and the rate of change of the temperature of the air supply and the temperature of the air supply are limiting controls.

A further object is temperature control utilizing an electronic sensing and amplifying mechanism controlling a pneumatic control system regulating the temperature to be controlled.

A still further object is an electronic temperature sensing and amplifying system utilizing one temperature as a primary control and imposing a rate of change limit control and a maximum temperature limit control on said primary control.

Other objects and advantages will be apparent to those skilled in the art from the following specification and the attached drawings in which:

Fig. 4 is an enlarged detail of the throttle valve actuating mechanism including the solenoid actuated flapper valve and servo feed-back.

Figure 1:
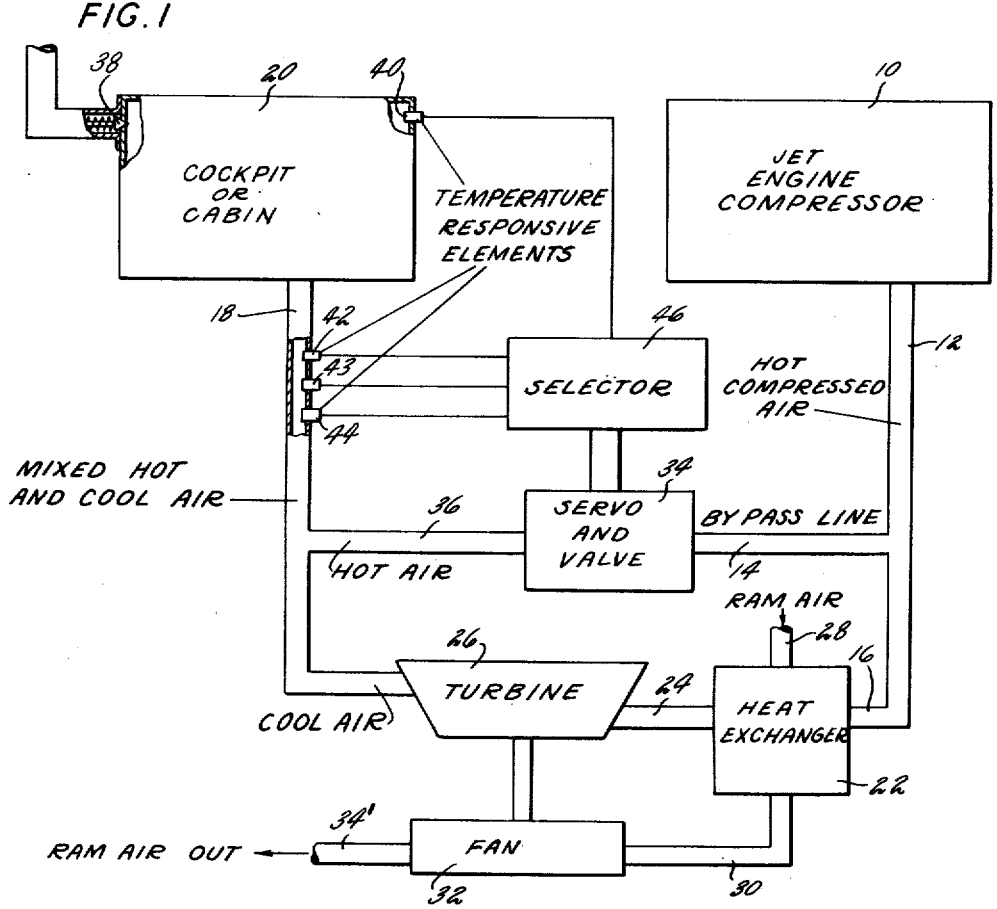
Fig. 1 is a schematic showing of the general arrangement of the control system applied to an airplane cabin temperature control.

The design of an air conditioning system for the present-day aircraft entails the consideration of several factors which vary with changes in flight operation and which dictate the requirements of the system. For example, during ground operation and at low level flight the system may be required to deliver a cooling air stream to the aircraft cabin or cockpit to provide comfortable conditions for the occupants thereof. At moderate altitudes the system may be required to deliver a warm air stream and during high-altitude, high-speed operation the system will probably be called upon for a cold air supply.

In the past, various systems have been developed to utilize a compressed air source, such as a bleed from the compressor of a turbine, and to supply air at the various temperatures required for cabin comfort. In such systems some of the hot compressed air is cooled by conventional means to provide a cold air cabin supply and some of the hot compressed air is utilized to supply a hot air supply. The hot and cold air supply are mixed in varying proportions and led to the cabin or cockpit to apparatus for regulating the cabin temperature.

The systems may also be adapted in accordance with conventional practices to maintain a selected cabin pressure. Since the present invention relates primarily to improvements in air temperature control apparatus, pressure control consideration will be only briefly referred to.

The present invention may be briefly described as embracing improvements in the control system and in the apparatus for regulating the cabin temperature.

Referring to the drawings the specific embodiment chosen to illustrate the invention comprises a source 10 of compressed air which may be the compressor of a jet engine. Hot air from the compressor is bled through line 12 and through two parallel lines 14 and 16 to the cabin inlet conduit 18. The air which is discharged from the compressor 10 to the conduit 16 is cooled to provide the previously mentioned cold air supply for the cabin 20 and the air which is discharged to the conduit 14 by-passes the cooling system and provides the hot air supply for the cabin.

With specific reference to the cold air supply it will be noted that the air in conduit 16 is passed through a heat exchanger 22 to give up a major portion of its heat and is then passed through conduit 24 to drive a turbine 26 which will remove energy from the air stream and, in so doing, further reduce the air temperature. The cooled air is fed from the turbine 26 to the cabin inlet conduit 18. The cooling air for the heat exchanger 22 is introduced through a line 28 which may be supplied with ram air. After passing through the heat exchanger 22 cooling air is led through conduit 30, through a fan 32 driven by the turbine 26, and is then discharged overboard through a conduit 34'. The fan 32 provides a load for the turbine 26 permitting the turbine to perform work and extract heat from the air passing through the turbine.

The hot air supply led through by-pass 14 is controlled by a valve 34 and is then led through conduit 36 to the cabin air inlet conduit 18. The hot air supply from the conduit 36 and the cold air supply from the turbine 26 are mixed in the cabin air inlet conduit 18 before introduction to the cabin. The proportion of the mixture is controlled by valve mechanism 34 which is automatically operable in response to temperature responsive means in the cabin 20 and in the duct 18.

The system has been described without consideration of the pressure requirements for various altitudes and varying conditions of flight operation. For purposes of simplicity it may be assumed that the system will deliver air to the cabin under pressure sufficient for all contemplated flight conditions and a pressure responsive cabin ventilator or relief valve 38 is arranged to maintain cabin pressure at a desired or selected level.

The above-described cabin air supply system may be more fully understood if arbitrary figures of temperature and pressure are used in the explanation of the operation. It will be understood that these figures are for the purpose of explanation only and that the invention is not limited to these particular figures or ranges.

If the compressor delivers air at 700 degrees Fahrenheit and at 60 p.s.i., it will be quite apparent that the hot air cabin supply in the line 14 will be at or near 700 degrees Fahrenheit and at 60 p.s.i. In passing from conduit 16 to conduit 24 through the heat exchanger, the temperature of the hot compressed air may be reduced to 200 degrees Fahrenheit and the pressure reduced to 55 p.s.i. In passing from the conduit 24 to the cold air supply conduit 18 through turbine 26, temperature of the air may be reduced from 200 degrees Fahrenheit to 0 degrees Fahrenheit and the pressure reduced to 10 p.s.i.

Thus we have available a cool or cold air supply of 0 degrees Fahrenheit and 10 p.s.i. and a hot air cabin supply throttled from 700 degrees Fahrenheit and 60 p.s.i.

If it is desired to maintain an air temperature of approximately 65 degrees Fahrenheit within the cabin or cockpit 20 and the outside air temperature is 95 degrees Fahrenheit, such as might occur at sea level under slow speed conditions, it will be apparent that there will be little or no need for hot air supply through the conduit 36. Accordingly, hot air supply throttle valve 34 may be closed or substantially closed. However, if flight conditions change so that the outside air temperature dropped to 0 degrees Fahrenheit, it will be apparent that the throttle 34 must be opened to introduce a greater amount of hot air and because of its by-pass connection simultaneously reduce the supply of cold air in order to maintain the selected 65 degrees temperature within the cabin. If flight conditions further change such as an increase in speed so that the air friction will heat the cabin although the outside air temperature may be low, it may be necessary to again supply cool air to the cabin. Under some conditions it may be necessary to maintain cold air supply at a temperature near the limit of the cool air supply in which case the valve 34 should again be closed or substantially closed.

In accordance with the present invention, the valve mechanism 34 is controlled by temperature responsive elements comprising an element 40 located in the cabin 20 to sense the cabin temperature, elements 42 and 43 located in the inlet duct 18 to sense the temperature of the mixed air fed to the cabin through conduit 18 and an element 44 located in the conduit 18 to sense any changes in the mixed air temperature. Signals from these four temperature responsive elements are fed to an electronic selector circuit 46 which will select the signal to control the valve 34. The selected signal will energize a proportional solenoid indicated generally at 35 and through a servo-mechanism operate valve 34. Signals from the element 40 will move valve 34 to substantially maintain a selected cabin temperature. Signals from the element 42 will override signals from the element 40 in the event the mixed air temperature exceeds some preselected value such as 250 degrees to thus limit the maximum temperature of air which may be fed to the cabin to avoid damage to the cabin structure or discomfort to the cabin occupants. Signals from the element 43 will override signals from the element 40 in the event the mixed air temperature falls below some preselected value such as 34 degrees to thus prevent ice formation in the ducts. Signals from the element 44 through condenser 122 will temporarily override signals from the cabin element 40 and prevent rapid changes of temperature of the mixture air and thus tend to stabilize the entire system. It has been found that the temperature of the supply of air from the compressor may vary rapidly over a material range during flight. This rapid material change in the condition of the air supply would be reflected in a material change of the temperature of the mixed air and might well result in a material change in the cabin or cockpit temperature before responsive element 40 could make the necessary corrections in the setting of valve 34. Temperature responsive element 44 through the electrical circuit connected therewith provides signals responsive to rate of change of temperature which tend to prevent rapid changes of temperature of the air delivered through conduit 18 and thus prevent the above described fluctuations of cabin temperature and tend to stablize the system and prevent overshooting of temperature.

Valve 34 is shown in more detail in Figure 4 in which the throttle 48 is indicated as located between conduits 14 and 36. Valve 48 is mounted on a shaft 50 for operation by a slotted lever 52 which in turn is operated by a servo-piston 54. A supply of air from conduit 14 upstream of the valve 48 is led through a restriction 56 into a conduit having branches 58 and 60. Conduit 58 leads to the chamber 62 above the diaphragm 64 of piston 54 and conduit 60 leads to a nozzle 66 whose discharge area is controlled by a flapper valve 68 mounted on a pivoted lever 69. The free area of the restriction 56 is small, say about ⅛, in comparison with the free area of nozzle 66 when the flapper valve 68 is wide open so that the pressure in line 60 is a function of the distance between the flapper 68 and the nozzle 66 and controls the pressure in the servo-chamber 62. As the flapper 68 approaches the nozzle 66, the free area of the nozzle will proportionally decrease which will restrict the flow through the nozzle 66, increase the pressure in line 60, increase the pressure drop across nozzle 66, reduce the pressure drop across restriction 56, and increase the pressure in the servo-chamber 62. An increase in pressure in the servo-chamber 62 will force the piston 54 down and through the pin 70 which connects piston 54 and slotted lever 52 turn shaft 50 to open the valve 48. Conversely, if flapper 68 is moved away from nozzle 66, the free area of nozzle 66 is proportionally increased which will drain off some of the air in line 60 and proportionally reduce the static pressure in chamber 62 and permit spring 72 to force piston 54 upwardly and turn shaft 50 to move valve 48 in a closing direction.

Lever 69 may be rocked about its pivot 74 by the effects of electric current in the coils 80 and 82 of the proportional solenoid 35. The current in these coils is controlled by temperature error signals fed through an electronic control system described hereinafter. The proportional solenoid 35 acts on the principle set forth in more detail in Best Patent No. 2,579,723 issued December 25, 1951, to which reference may be made for further details of principle of operation of this type of solenoid. The present structure has been modified from that shown in the Best patent, however, to provide a pivoted lever 69 instead of the linearly movable armature of the Best patent.

Generally permanent magnet 84 has two flux paths, one through the core of each of the solenoids 80 and 82 and the lever 69. The magnetic fields of the solenoids 80, 82 provide a flux through lever 69 and the cores of the solenoids 80, 82 opposing one of the two permanent magnet flux paths and assisting the other so as to provide a greater attraction at one end of lever 69 than at the other, and thus provide a force proportional to the current in the coils 80 to move the lever 69 about pivot 74.

Movement of the lever 69 will compress the spring 78 or springs 76, 88 to provide an opposing force with a spring rate substantially equal to but slightly larger than the negative spring rate of the porportional solenoid. i.e., the rate of increase of permanent magnet pull due to movement of lever 69 alone.

In the structure chosen to illustrate the present invention, centering spring 78 is opposed by a feed-back spring 88 having a force such that equilibrium is established around pivot 74 by the net force of springs 78 and 88, the force of centering spring 76, whatever residual force exists from the permanent magnet, the force exerted by current in the solenoid and the comparatively small force due to the pressure acting on the flapper valve at the nozzle.

As indicated above, movement of the lever 69 by the proportional solenoid 35 will operate flapper valve 68 to vary the pressure in servo-chamber 62 to thus turn shaft 50 and to operate valve 48. Mounted on shaft 50 to turn therewith is a cam 86 adapted to vary the compression of a spring 88 acting between cam 86 and one end of lever 69. This spring acts as a feed-back mechanism which will tend to restore valve 68 to its original position and thus reduce the travel distance of the valve 68. For instance, if the proportional solenoid 35 should call for more heat, the current in proportional solenoid 35 will turn lever 69 clockwise about its pivot 74 to force the flapper 68 toward the nozzle 66. As pointed out above, this will increase the pressure in chamber 62 and move valve 48 in an opening direction which will supply a larger proportion of hot air to the conduit 18 leading to the cabin. This movement of shaft 50 will also move the cam 86 counterclockwise and thus relieve compression in spring 88 which will tend to return lever 69 back to its original position.

The spring 88 thus acts as a force feed-back mechanism which will reduce the magnitude of response of both valve 68 and valve 48 due to a change in solenoid current, but will also reduce the effect of extraneous forces on the system. Any tendency of the valve 48 to move due to unbalanced air forces acting on the valve due to the flow of air through conduits 14, 36 will result in a change in the position of spring 88 which by moving valve 68 a small distance will produce a large force change on piston 54 opposing the movement of valve 48.

For each value of solenoid force, a certain spring compression or force and nozzle force is required to meet it to give a balance of force on lever 69. The spring force is a function of throttle valve position, and the nozzle force, which is dependent on the presure in chambers 60 and 62 which determines the position of throttle valve 48, is a function of the throttle valve position; hence for each value of current the throttle valve 48 must have a unique position for equilibrium of force on lever 69.

Any increase in pressure due to a change in the pressure source will tend to increase the pressure in chamber 60 and produce movement of 54 toward opening. This pressure increase in chamber 60 will produce a small increase in force acting on flapper valve 68 tending to open the flapper valve and reduce the pressure in chamber 60. The increase in pressure above piston 54 will produce movement of piston 54 which will relieve the force of spring 88. Flapper valve 68 will be moved by these forces until a new equilibrium position of flapper 68 and lever 69 is reached. The effect on lever 69 of a small change in the position of spring 88 is much greater than the effect of the change in nozzle pressure on flapper valve 68. Only a small movement of flapper valve 68 is required to produce a large pressure difference in chamber 60 and such a small change in spring 88 is required to produce the small movement of flapper valve 68 that the movement of butterfly valve 48 with the changes in pressure of the pressure source is immaterial.

It is desired to position the butterfly valve 48 as closely as possible proportional to the current in the solenoids 80, 82. In the present embodiment the effect of nozzle pressure in the flapper valve is small, say about ⅒, in comparison with the effect of the spring forces, especially feed-back spring 88, on the lever 69 due to the same pressure change in chamber 60. A change in the current in proportional solenoid 35 will move lever 69 and flapper valve 68 to change the pressure in chamber 60 and move piston 54 and the butterfly valve 48. Movement of piston 54 will change the force of feed-back spring 88 until the resultant force of the three springs 76, 78, and 88 substantially balances the pull of the solenoid. Hence it will be noted that while the nozzle pressure on flapper valve 68 has some slight effect, the major positioning forces on lever 69 is the pull of solenoids 80, 82, and the adjustable net force of the three springs 76, 78, and 88 which is adjusted by the pressure in line 60 acting on diaphragm 64 and adjusting spring 88 to thus balance the solenoid pull. Thus pressure changes in chamber 60 are corrected by small changes in the position of the feed-back spring and lever 69 while changes in current in solenoids 80, 82 will produce sufficient force to require material movement of the feed-back spring to balance, and hence current changes in solenoids 80, 82 will result in material movement of the butterfly valve 48.

The operation of this device can perhaps be better understood if specific values are used in the explanation. The flapper valve 68 travel may be in the nature of 5 to 8 thousandths of an inch to give a complete range of pressure in chamber 62 from compressor pressure of about 60 p.s.i. down to substantially 0 pressure or ambient pressure. Such a pressure range will be sufficient to move valve 48 from completely open to completely closed position. Hence a .005 to .008 inch movement of flapper valve 68 will be sufficient to move the feed-back spring through its entire range of compression. As the solenoid force which is proportional to the solenoid current bears a direct relation to the feed-back spring 88 force it follows that the complete range of solenoid current will move the flapper valve 68 only .005 to .008 inch but will cause valve 48 to move through its entire range.

In the selected embodiment, increasing current in the solenoids calls for more heat and will close flapper valve 68 and increase pressure in chamber 60 forcing piston 54 down and opening by-pass butterfly valve 48 to provide more heat. Decreasing current in the solenoids will permit spring 78 to open the flapper valve and at zero current the flapper valve will be fully open. Each current value in the solenoids represents a corresponding pressure in chamber 60 which represents a corresponding position of butterfly valve 48.

Figure 2:
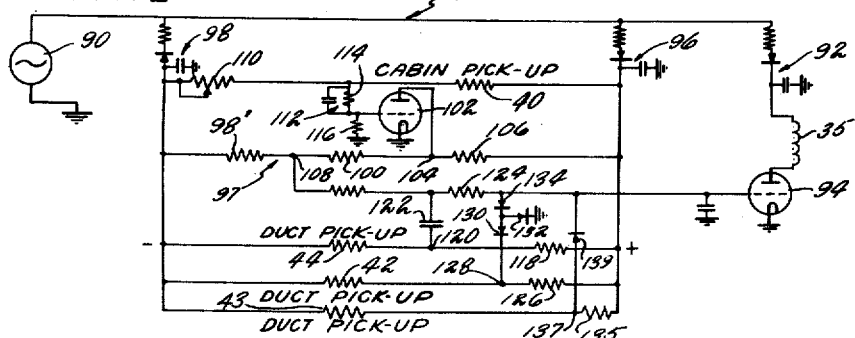
Fig. 2 is a schematic showing of the electronic system, including the temperature pick-ups and the solenoid for operating the by-pass control valve.

The electronic circuit or selector 46 shown in Fig. 2 takes a signal from the temperature responsive cabin pick-up 40 amplifies it and provides a proportional current in the proportional solenoid 35. Four pick-ups in the form of temperature sensitive resistors known as thermistors, which have a negative temperature coefficient such that an increase in temperature will reduce their resistance, are provided one (40) in the cabin to regulate the cabin temperature, one (42) in the mixing conduit 18 leading to the cabin for limiting the maximum temperature of the air fed to the cabin, one (43) in the mixing conduit 18 to limit the minimum temperature of the air fed to the cabin, and another (44) in the mixing conduit 18 to limit through its electric connections the rate of change of temperature in the air being fed through the duct 18 to the cabin.

Power for the electronic circuit is provided by a source of alternating current 90 feeding three power supplies comprising the usual resistors, rectifiers, and condensers. One power supply 92 supplies the power for the plate circuit of an electron tube 94 including the proportional solenoid 35. The other two power supplies 96, 98 provide a voltage difference, 96 providing a plus voltage and 98 providing a negative voltage. Each of the thermistors forms part of a voltage divider circuit across the voltage difference so that changes in the resistance of the thermistor will provide a voltage change or signal which can be used to control the current in the proportional solenoid 35. The designator used in the showing of the rectifiers is that of current flow from plus to minus as distinct from electron flow.

If proportional solenoid 35 is placed in the plate circuit of the tube 94 between the plate and the power supply 92, the plate current and hence the current through the proportional solenoid 35 is controlled by controlling the grid voltage of the tube 94. This grid voltage is controlled, for regulating the cabin temperature, by varying the bias on a voltage divider 97, consisting of resistors 98' and 100 connected between the plate of a tube 102 and a negative power supply 98. The junction 104 of the plate of the tube 102 with the voltage divider 97 is connected to a positive power supply 96 through a resistor 106. When there is no current flowing in the tube 102, the voltage at the junction 104 at the upper end of the voltage divider 97 is substantially the same as the voltage in the positive power supply 96. When, however, the tube 102 draws current an increasing voltage drop occurs across the resistor 106 due to the tube current, thus reducing the voltage at the positive end of the voltage divider 97. Reduction of voltage at the upper end 104 of voltage divider 97 will reduce the voltage at the mid-point 108 of the voltage divider 97, and thus reduces the voltage applied to the grid of the tube 94.

The current flow in the plate circuit of the tube 102 is controlled by varying the voltage on its grid which is done by connecting the grid substantially midway of a voltage divider comprising a cabin pick-up thermistor 40 and a resistor 110 connecting the positive power supply 96 with the negative power supply 98 as indicated. Resistor 110 may be adjustable if desired, as indicated in Fig. 2. The condenser resistor combination 112 is an anticipating device which will, upon a rapid change of cabin pick-up voltage, act to provide a greater voltage at the grid than would result from the resistors 114 and 116 alone, the condenser acting as a sort of by-pass to the resistor 114 during the rapid changes while the condenser is changing in one direction or the other. The combination 112 will thereby anticipate the need for more or less heat by temporarily overbiasing the grid of the tube 102.

If the cabin temperature is too cold, the resistance of the thermistor 40 will increase, which will provide more negative voltage at the grid of the tube 102, which in turn will reduce the current flow through the tube, which will increase the voltage at the upper end of the voltage divider 97, which will provide a more positive voltage on the grid of tube 94, which will increase the plate current of tube 94 including the current flow through the proportional solenoid 35, which will close flapper valve 68, which will increase the pressure in chamber 60 and chamber 62, which will force the piston downward, which will draw pin 70, turn shaft 50 and open modulative butterfly valve to supply more heat to the cabin.

The rate of change thermistor 44 and resistor 118 form a voltage divider connecting the positive power supply 96 to the negative power supply 98. The junction 120 of these resistors is connected through a condenser 122 with the grid of the tube 94. The condenser 122 acts to pass only the rate of change of voltage. The resistor 124 in the grid circuit is only for protecting the tube against excessive grid current in the event that the grid is made positive by condenser 122. If the duct pick-up 44 changes resistance rapidly, it will produce a proportional change in the grid voltage of the tube 94 by means of condenser 122, and hence will oppose the change in duct temperature until the condenser 122 is again stabilized. An increase in duct temperature will decrease the resistance of the pick-up 44 which will make the junction 120 more negative and thus make the grid of tube 94 more negative while the condenser 122 is charging. The increase in duct temperature reduces the current through the proportional solenoid proportional to the rate of increase, and moves the modulating valve toward closed position and thereby reduces the flow of hot air and thus reduces temperature of the mixed air in the duct 18 and thus opposes and limits the change of temperature. When the condenser 122 has again stabilized, i.e., when the duct temperature becomes stable or constant, the duct pick-up 44 will then have no further effect.

The maximum temperature limiting device is a similar voltage divider, comprising a duct pick-up 42 and a resistor 126 connecting the positive power supply 96 with the negative power supply 98 with the junction 128 connected through rectifiers 130, 132, and 134 with the grid of the tube 94. When the duct temperature reaches a predetermined high limit, the resistance of the duct pick-up 42 will have been reduced to such a point that the junction 128 will become so negative that the rectifiers 130 and 134 will conduct and supply a negative voltage to the grid of the tube 94, thus reducing the plate current of the tube 94 and the current in the proportional solenoid 35, thus causing the modulating valve to close and reduce the quantity of hot air being supplied to the mixing conduit 18. Rectifier 132 is placed in the circuit to ground out any positive voltage that may leak through back conduction of the rectifier 130.

From the above description it will be apparent that we have provided a system in which a cabin pick-up will provide a signal which will control the temperature of the air within the cabin or cockpit of an airplane. This cabin control will generally do all of the regulating. However, if the air supply is taken from the compressor of a turbine engine, it is subject to material variation in temperature as well as pressure, and these variations may be quite rapid. Under such circumstances it is possible that the cabin control cannot act fast enough to prevent an uncomfortable change in the temperature of the air being supplied to the cabin or cockpit. Under these circumstances the rate of change pick-up comes into action and is arranged to be responsive to comparatively small changes in the temperature of the air passing through the mixing conduit 18. Any rapid change immediately results in a voltage change charging or discharging condensor 122, and, while the change is taking place, will modify the voltage appearing at junction 108 and being supplied through the cabin pick-up system to the grid of the tube 94 to such an extent as to take over substantial control of the modulating valve and change the flow of hot air so as to maintain the temperature of the air flowing through the duct very nearly constant. The system is so proportioned that a limited rate of change is permitted to allow necessary increases or decreases in the temperature of the mixed air to maintain the desired or selected cabin temperature under the various flight conditions, but the permissible rate of change is limited so that the rapid changes in the supply temperature are not reflected in rapid changes in cabin temperature.

The limiting pick-up 42 is set to take over absolute control when the temperature of the air in the duct reaches, say 250 degrees Fahrenheit, to thereby prevent excessive air temperature from injuring either the cabin structure or its occupants.

While the upper limit is usually sufficient for extreme limit control and with the rate control described above will provide a satisfactory practical device, a low limit control may, if desired, be added to limit the minimum temperature of the air in duct 18 to thus avoid icing or similar troubles.

The minimum temperature limiting device shown in Fig. 2 is a voltage divider comprising a duct pick-up 43 and a resistor 135 connecting the positive power supply 96 with the negative power supply 98. The junction 137 is connected through a rectifier 139 with the grid of tube 94. When the temperature of the air in the duct 18 reduces to a predetermined low, such as 35° F., the resistance of duct pick-up 43 will have been increased to a value such that the junction 137 will become positive with respect to grid 94 so that rectifier 139 will conduct and make the grid of tube 94 more positive or less negative thus increasing the plate current of tube 94 and the current in proportional solenoid 35. The modulating valve 48 will be opened by the current increase to increase the quantity of hot air being supplied to the mixing conduit. The voltage at junction 128 of the high limit circuit and junction 137 of the low limit circuit both rise and fall together but are spaced apart by a predetermined value, the junction 137 being a predetermined amount more negative than junction 128. Hence as they both rise, i.e. when the duct temperature decreases, rectifier 139 will conduct when voltage at 137 exceeds the grid voltage of tube 94 and will then determine the grid voltage of tube 94, but as the voltage at 128 rises at substantially the same rate, the junction 128 will always remain a fixed amount less negative than the grid of 94 although that grid is being made less negative by the junction 137 so that rectifiers 130, 134 will not conduct.

When the junctions 128 and 137 both decrease in voltage, i.e. when the duct temperature increases, rectifiers 130 and 134 will conduct when the voltage at 128 decreases below the grid of tube 94, but as the voltage at 137 decreases at substantially the same rate, rectifier 139 will be biased to nonconduction even with the decreasing grid voltage of tube 94.

Figure 3:
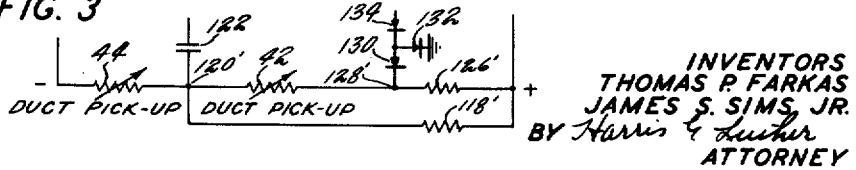
Fig. 3 is a modification of the circuit of Fig. 2.

As shown in Fig. 2 and for ease in explanation, two separate voltage dividers, one comprising pick-up 44 and resistor 118 and the other comprising pick-up 42 and resistor 126, were used in the limiting controls. It should be understood however that modification may be made in the signal creating circuits for these limiting devices as shown, for example, in Fig. 3 in which the two voltage dividers have been combined. By connecting the resistor 118', small with respect to the total resistance of resistor 126' and pick-up 42, to form a parallel circuit with resistor 126' and pick-up 42, the change in resistance of pick-up 42 will have immaterial adverse effects on the rate pick-up 44. As the temperature of the air in the duct increases, the resistance of both pick-up 44 and 42 will decrease. However, because of the comparatively small resistance of resistor 118', the change in resistance of pick-up 42 will have only an immaterial effect upon the voltage at junction 120' while the change in the pick-up 44 will have an immaterial effect upon the voltage at junction 128'. The decrease in the resistance in the pick-up 44 in effect increases the sensitivity of the pick-up 42 in that as the air temperature in the mixing chambers increases and the resistance of the pick-ups decreases, the decreasing resistance of pick-up 42 will bring the voltage of the junction 128' closer to that of 120', and the decrease in the resistance of pick-up 44 will make the voltage at 120' more negative so that in effect both pick-ups co-operate to make the junction 128' negative as both of their resistances decrease. As in Fig. 2, when the junction 128' has become sufficiently negative then rectifiers 130 and 134 will conduct to reduce or eliminate the plate current in tube 94 and the solenoid 35 and thereby reduce or eliminate the flow of hot air passing butterfly valve 48 into the mixing chamber 18 leading to the airplane cockpit.

It is to be understood that the invention is not limited to the specific embodiment herein illustrated and described, but may be used in other ways without departure from its spirit as defined by the following claims.

We claim:

1. In an aircraft having a cabin, a source of compressed air, conduit means conducting said air to said cabin, said conduit means including air cooling means and by-pass means around said cooling means, valve means controlling said by-pass, means responsive to cabin temperature proportionally positioning said valve, means responsive to the rate of change of the temperature of the air entering said cabin, and means connecting said rate responsive means and said valve means for proportionally positioning said valve for limiting the rate of change of the temperature of the air entering said cabin in proportion to said rate of change.

2. Temperature control means comprising a source of heated air, a source of cooled air, means for mixing said heated and cooled air including a modulating valve, means responsive to the temperature of said mixed air including means producing an electric signal proportional to the rate of change of said air temperature, means positioning said modulating valve to regulate the temperature of the mixed air and means converting said electric signal into a proportional position of said valve to control the rate of change of the temperature of the mixed air by positioning said valve in proportion to the strength of said electric signal.

3. In an aircraft having a compartment the temperature of which is to be controlled, a source of heated compressed air, means cooling a portion of said heated air to provide a source of cooled air, a mixing chamber, means conducting said heated and said cooled air to said mixing chamber, means conducting mixed air from said mixing chamber to said compartment, valve means controlling the flow of heated air to said chamber, servo mechanism operating said valve means, temperature responsive means producing an electrical signal in accordance with compartment temperature, means producing an electrical signal in accordance with the rate of change of temperature of said mixed air, means transforming said signals into proportional positions of said valve means, including electro-magnetic means receiving said signals, and a valve actuated by said electro-magnetic means and connected with said servo mechanism to control actuation of said servo mechanism.

4. In an aircraft propelled by a power plant including a gas turbine and an air compressor and having a compartment wherein the air for said compartment is delivered through a conduit from the compressor to said compartment, in combination, means regulating the temperature of the air discharged from said conduit into said compartment, means responsive to the temperature of the air in said compartment controlling the discharge temperature and means responsive to the rate of change of the discharge temperature for positioning said regulating means proportional to said rate of temperature change to limit the rate of change of the discharge temperature.

5. In control apparatus, a condition varying device to be controlled, an electrical network for controlling said device, said network comprising a plurality of voltage dividers, each divider including a resistance automatically variable with a condition to be controlled, means, connecting one divider with a control motor connected with said device, and sensitive to voltage changes in said divider for controlling said condition, means, including a condenser, connecting another divider with said motor, and sensitive to the rate of voltage change in said other divider for limiting the rate of change of said condition.

6. An electrical temperature control network comprising voltage dividers arranged between voltage sources of opposite polarity, one divider comprising a temperature responsive resistance, mechanism utilizing the voltage of said divider to control current flow through a portion of a second divider, means utilizing the voltage of said second divider as a temperature control voltage, a third divider comprising a second temperature responsive resistance, means including a condenser connecting said third divider with said second divider, and said utilizing means to provide an anticipating control voltage upon a change of resistance of said second temperature responsive resistor to oppose the cause of said change.

7. In control apparatus for a space, means supplying a condition changing medium to said space, means varying the condition changing ability of said medium, condition responsive means continuously controlling said varying means, and rate responsive limiting means continuously limiting the rate of variation of said condition changing ability of said medium in proportion to said rate.

8. In control apparatus controlling the temperature of a space, means supplying air to said space, means varying the temperature of said air, means responsive to the temperature of the air in said space continuously controlling said varying means proportional to the departure of said temperature from a selected reference temperature, means responsive to the rate of change of the temperature of the air being supplied to said space, and means continuously connecting said last mentioned temperature rate responsive means with said varying means for limiting the rate of change of the temperature of the air being supplied to said space by positioning said varying means proportional to said rate of change.

9. Control apparatus as claimed in claim 7 in which said limiting means comprises means converting an electric signal responsive to a condition of said medium into a signal proportional to the rate of change of said condition, and means continuously converting said rate signal into a force acting on said varying means to proportionally limit the rate of variation.

10. Control apparatus as claimed in claim 8 in which said rate responsive means comprises means producing an electric signal proportional to the temperature of the air being supplied to said space and means converting said signal into a rate of temperature change signal proportional to said rate of change and means continuously converting said rate signal into a proportional position of said varying means to reduce the rate of variation in proportion to said rate.

11. In control apparatus for controlling the condition of a space, means supplying condition changing medium to said space, means for varying the condition changing ability of said medium by varying said condition of said medium, means producing electric signals in accordance with a departure of said condition of said space from a selected standard, and means producing electric signals responsive to said condition of said medium and including means converting said last-mentioned electric signals into signals proportional to the rate of change of said condition of said medium, means combining said first and last-mentioned electric signals and continuously converting the combined signals into a position of said varying means proportional to said combined signals.

12. The combination as claimed in claim 3 in which said valve is a flapper type valve connecting said source of compressed air with said servo mechanism.

13. In an aircraft having a cabin, a source of compressed air, conduit means conducting said air to said cabin, said conduit means including air cooling means and bypass means around said cooling means, valve means controlling said bypass, means responsive to cabin temperature proportionally controlling said valve movement, means responsive to the rate of change of the temperature of the air entering said cabin, means connecting said rate responsive means and said valve means for proportionally moving said valve for limiting the rate of change of the temperature of the air entering said cabin in proportion to said rate of change, and limiting means actuated by the temperature of the air entering said cabin and overriding said cabin temperature responsive and rate responsive means and responsive to temperatures in excess of a selected maximum for limiting the maximum temperature of said air entering said cabin by adjusting said valve means.

14. In an aircraft having a cabin, a source of compressed air, conduit means conducting said air to said cabin, said conduit means including air cooling means and bypass means around said cooling means, valve means controlling said bypass, means responsive to cabin temperature proportionally controlling said valve movement, means responsive to the rate of change of the temperature of the air entering said cabin, means connected said rate responsive means and said valve means for proportionally moving said valve for limiting the rate of change of the temperature of the air entering said cabin in proportion to said rate of change and limiting means connected with said valve means and responsive to the temperature of the air entering said cabin and overriding said cabin temperature responsive and rate responsive means and responsive to temperatures below a selected minimum for limiting the minimum temperature of the air entering said cabin by adjusting said valve means.

15. In control apparatus, a condition varying device to be controlled, an electrical network for controlling said device, said network comprising a plurality of voltage dividers, each divider including a resistance automatically variable with a condition to be controlled, means, connecting one divider with a control motor connected with said device, and sensitive to voltage changes in said divider for controlling said condition, means, including a condenser connecting another divider with said motor and sensitive to voltage changes in said divider for limiting the rate of change of said condition, and a rectifier, connecting another divider with said motor and sensitive to selected voltages in said divider for limiting the extent of change of said condition in one direction.

16. An electrical temperature control network comprising voltage dividers arranged between voltage sources of opposite polarity, one divider comprising a temperature responsive resistance, mechanism utilizing the voltage of said divider to control current flow through a portion of a second divider, means utilizing the voltage of said second divider as a temperature control voltage, a third divider comprising a second temperature responsive resistance, means including a condenser connecting said third divider with said second divider, and said utilizing means to provide an anticipating control voltage upon a change of resistance of said second temperature responsive resistor to oppose the cause of said change, a fourth divider comprising a third temperature responsive resistance and means including a rectifier connecting said fourth divider with said utilizing means to limit the absolute value of the controlled temperature.

17. In an aircraft having a compartment the temperature of which is to be controlled, a source of heated compressed air, means cooling a portion of said heated air to provide a source of cooled air, a mixing chamber, means conducting said heated and said cooled air to said mixing chamber, means conducting mixed air from said mixing chamber to said compartment, valve means controlling the flow of heated air to said chamber, servo mechanism urged in one direction by air pressure and in the other by resilient means operating said valve means, temperature responsive means producing an electrical signal in accordance with compartment temperature, means producing an electrical signal in accordance with the rate of change of temperature of said mixed air, means transforming said signals into proportional movement of said valve means, including electro-magnetic means receiving said signals and a valve actuated by said electro-magnetic means and connected with said servo mechanism to control actuation of said servo mechanism by controlling said air pressure in accordance with the strength of said signals.

References Cited in the file of this patent

UNITED STATES PATENTS

| | | |
|---|---|---|
| 2,159,284 | Miller | May 23, 1939 |
| 2,331,476 | Jones | Oct. 12, 1943 |
| 2,376,525 | Taylor | May 22, 1945 |
| 2,403,917 | Gille | July 16, 1946 |
| 2,412,110 | Williams | Dec. 3, 1946 |
| 2,420,043 | Johnson | May 6, 1947 |
| 2,574,925 | Lehane | Nov. 13, 1951 |
| 2,603,422 | Sargeaunt | July 15, 1952 |
| 2,703,679 | Shank et al. | Mar. 8, 1955 |
| 2,782,994 | Dotson | Feb. 26, 1957 |

FOREIGN PATENTS

| | | |
|---|---|---|
| 1,053,765 | France | Oct. 7, 1953 |